Feb. 27, 1934.　　　　R. G. QUEHL　　　　1,948,871
FEED MIXING MACHINE
Filed April 7, 1930　　　5 Sheets-Sheet 1

INVENTOR
RICHARD G. QUEHL
By
ATTORNEYS

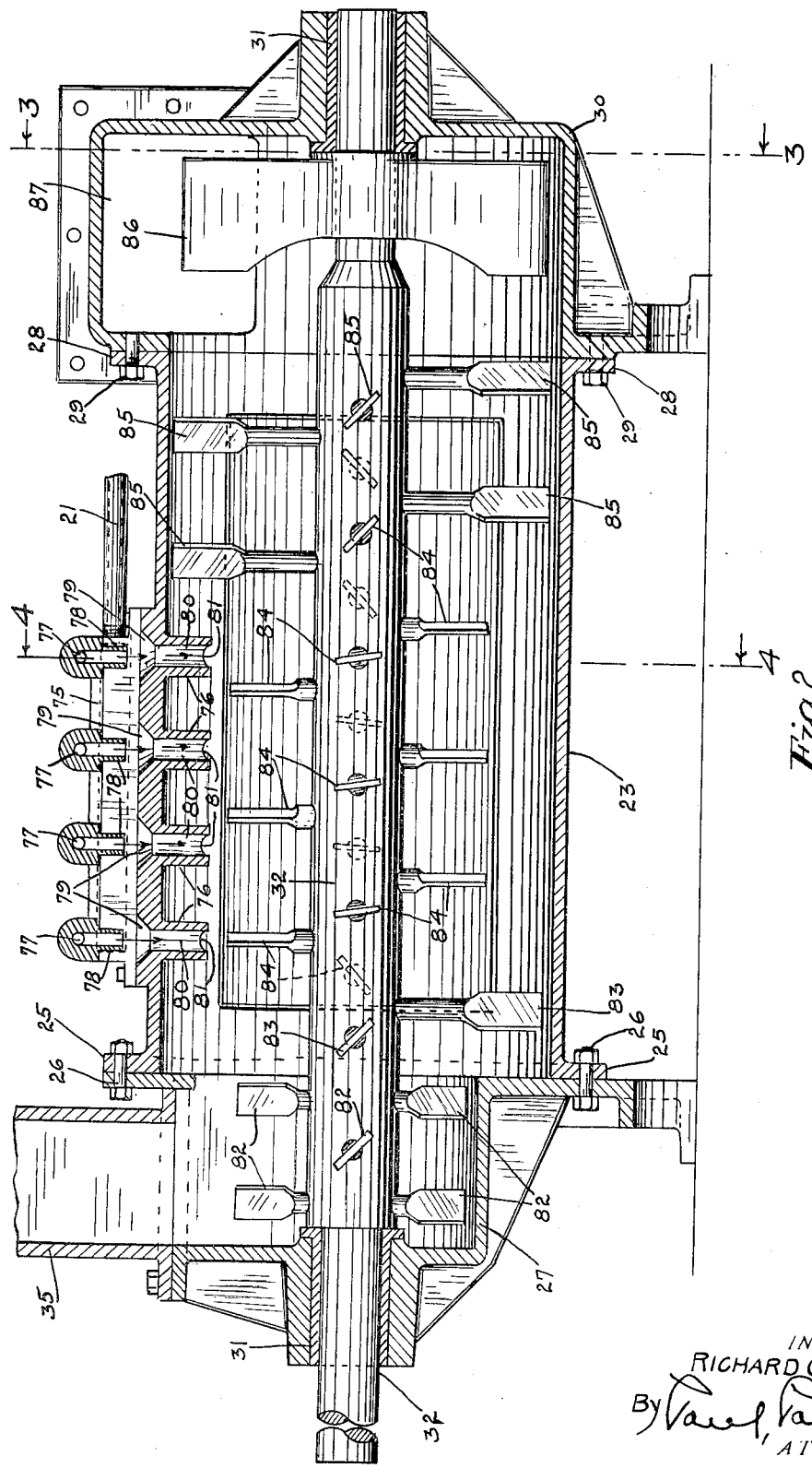

INVENTOR
RICHARD G. QUEHL
By Paul, Paul Moore
ATTORNEYS

Feb. 27, 1934. R. G. QUEHL 1,948,871
FEED MIXING MACHINE
Filed April 7, 1930 5 Sheets-Sheet 4

INVENTOR
RICHARD G. QUEHL
By
ATTORNEYS

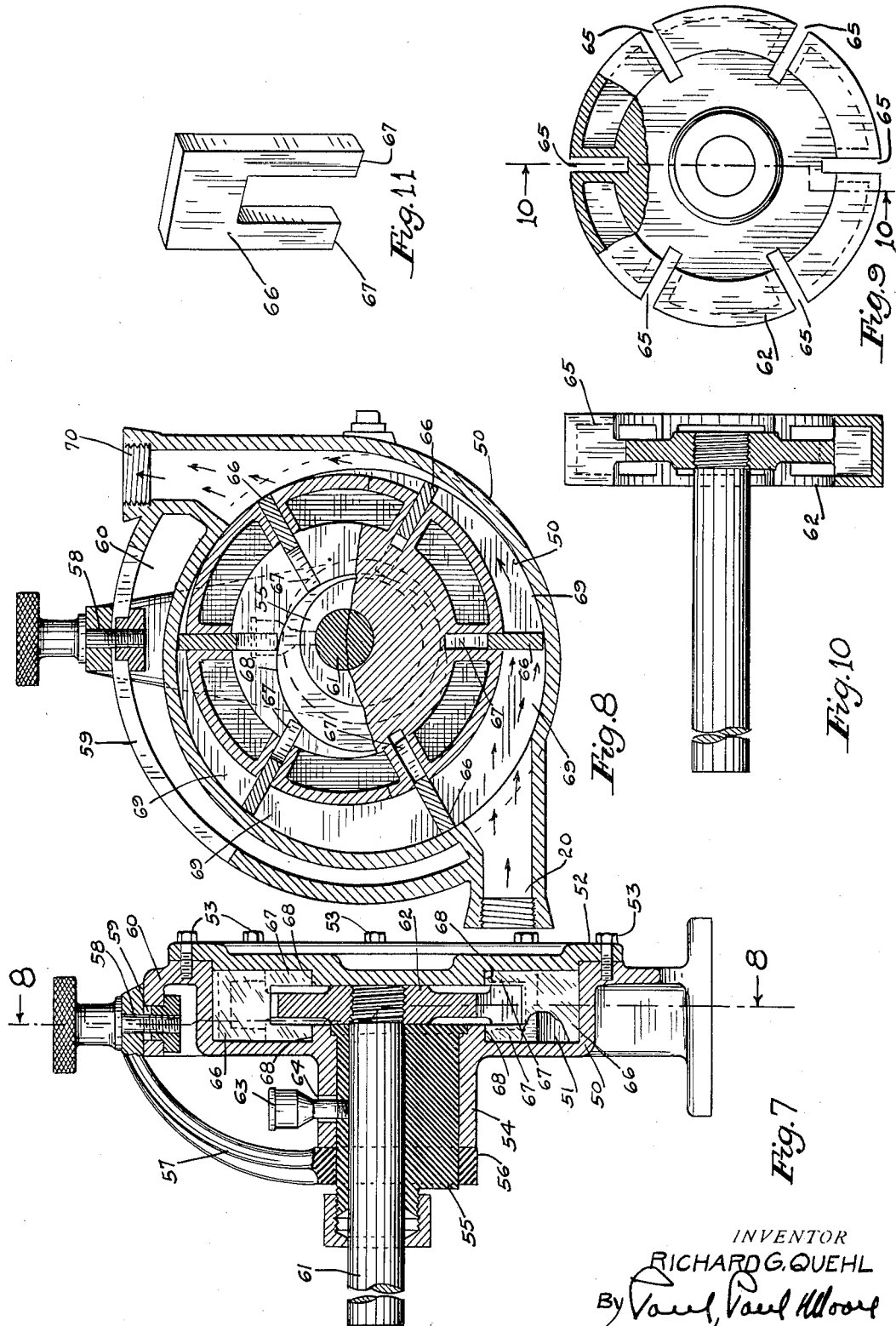

Patented Feb. 27, 1934

1,948,871

UNITED STATES PATENT OFFICE 1,948,871

FEED MIXING MACHINE

Richard G. Quehl, Minneapolis, Minn., assignor to The Strong-Scott Mfg. Co., Minneapolis, Minn., a corporation of Minnesota Application April 7, 1930. Serial No. 442,428

4 Claims. (Cl. 259—9)

This invention relates to a feed mixing machine, and an object of the invention is to provide a machine of the present character wherein will be incorporated certain novel and improved features and characteristics of construction adapted to render the present machine an improvement generally over all more or less similar machines heretofore known.

A further object is to provide a mixing machine having a feed mixer including mechanisms for causing the ingredients of a feed mixture to be produced to commingle or mix together at location spaced from the wall of the feed mixer, preferably at an upper portion of said feed mixer, before any more or less viscous ingredient will have opportunity to become settled or caked upon the wall of said feed mixer.

A further object is to provide a novel and improved type of regulator for feeding one or more of the ingredients of the feed to be produced to the mixer, said regulator being constructed to continuously deliver a constant quantity of material of any predetermined magnitude to the feed mixer.

With the above and other objects in view, the invention comprises the construction, arrangement and combination of parts as now to be fully described, it being understood that the disclosure herein is merely illustrative and meant in no way in a limiting sense, changes in details of construction and arrangement of parts being permissible so long as within the scope of the claims which follow.

In the accompanying drawings forming a part of this specification,

Fig. 2 is an enlarged, vertical, longitudinal sectional view of the feed mixer of the machine in Fig. 1;

Fig. 7 is a sectional view of the regulator, taken on line 7—7 in Fig. 5;

Fig. 8 is a sectional view of the regulator, taken as on line 8—8 in Fig. 7;

Fig. 9 is an elevational view of the rotor of the regulator, partially broken away and in section;

Fig. 10 is a sectional view of said rotor, taken on line 10—10 in Fig. 9; and

Fig. 11 is a perspective view of one of the wiper elements of the regulator removed therefrom.

Figure 1:
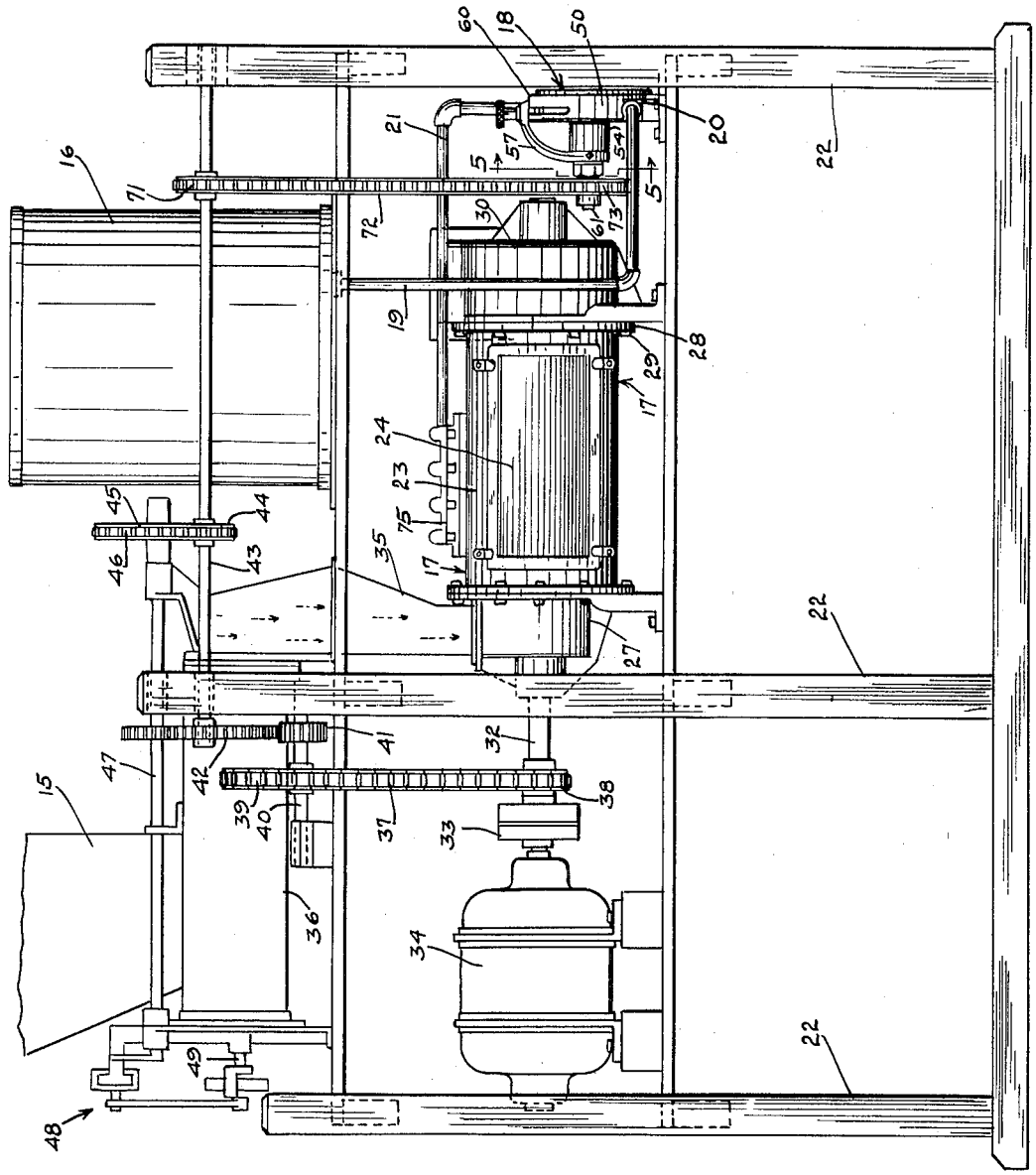
Fig. 1 is a side elevational view of a feed mixing machine in which the features of the invention are incorporated.

With respect to the drawings and the numerals of reference thereon, 15 represents a feed bin, 16 a feed tank, 17 a feed mixer, and 18 a feed regulator of the mixing machine of the invention. As disclosed, the feed bin 15 is adapted to contain granular feed material, and the feed tank 16 is adapted to contain liquid material, such as molasses, but it is to be understood that granular solid material could be contained in the tank 16, or an equivalent container, to be fed from said tank, through the regulator, to the feed mixer. A pipe 19 suitably connects the tank 16 to an inlet 20 leading to the feed regulator, and a pipe 21 connects the feed regulator to the feed mixer.

Numeral 22 designates a frame for supporting all of the parts of the feed mixing machine. As shown, the feed bin 15 and the feed tank 16 are suitably supported upon an upper portion of said frame 22, and the feed mixer 17 and the feed regulator 18 are suitably supported upon a lower part of said frame, beneath the feed bin and the feed tank.

Figure 4:
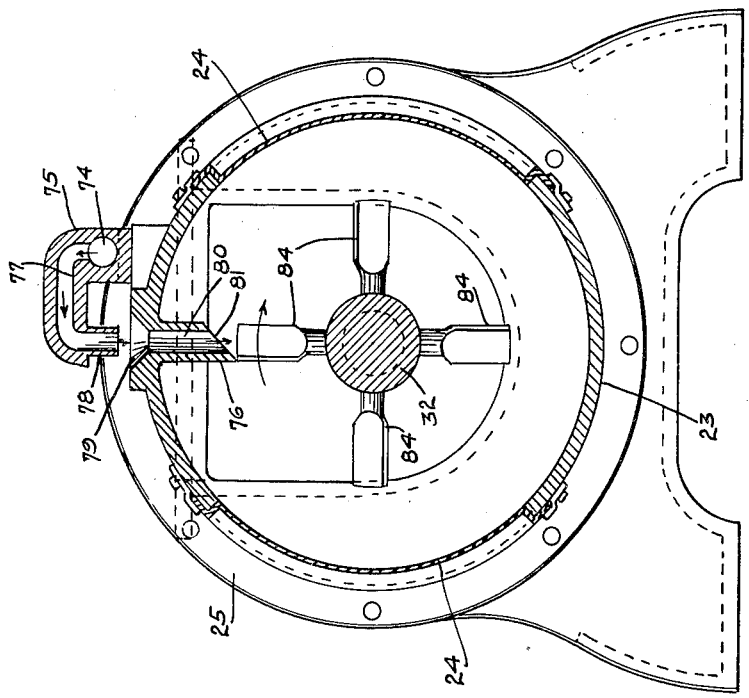
Fig. 4 is a transverse sectional view of the feed mixer, taken on line 4—4 in Fig. 2.
Figure 3:
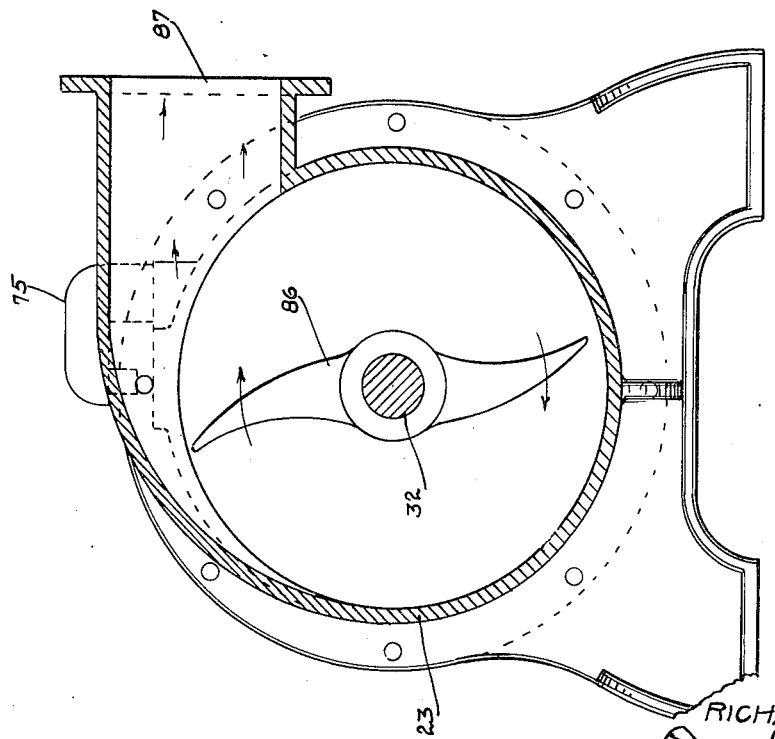
Fig. 3 is a transverse sectional view of the feed mixer, taken as on line 3—3 in Fig. 2.
Figure 6:
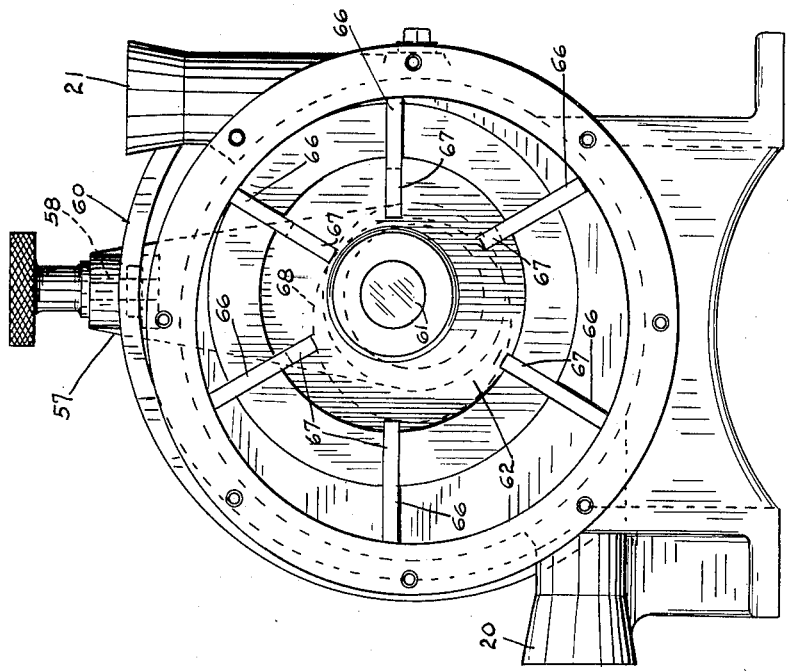
Fig. 6 is an elevational view of the regulator as seen from the rearward side of Fig. 5, the cover of the pump casing of said regulator being removed.
Figure 5:
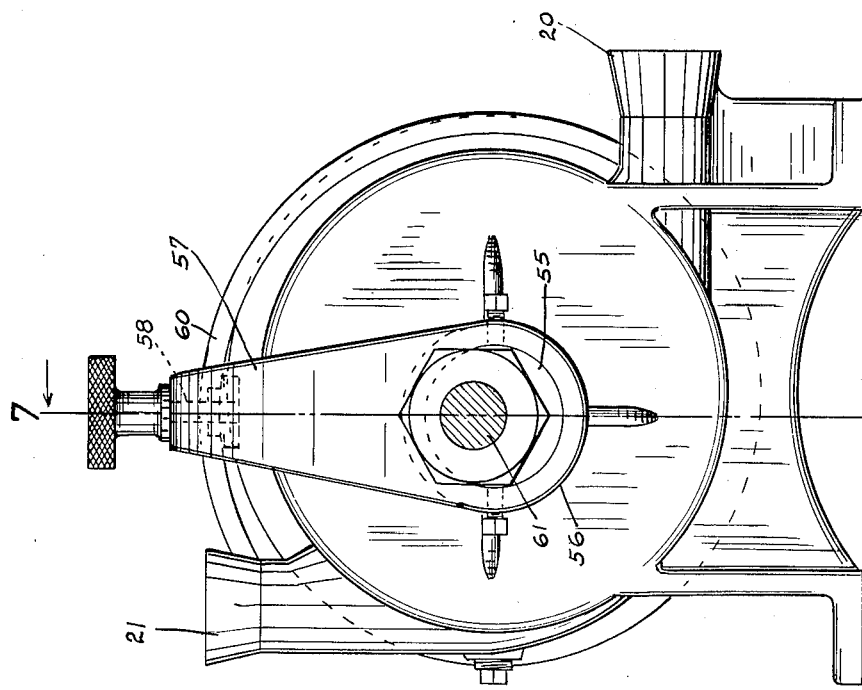
Fig. 5 is an enlarged elevational view of the regulator of the feed mixing machine, as seen from the position of line 5—5 in Fig. 1, showing the regulator removed from the machine, and omitting the connection from the feed tank and the driving sprocket for said regulator.

The construction of the feed mixer is best disclosed in Figs. 2, 3 and 4. As there shown, the feed mixer includes a cylindrical body 23 having an openable door 24. One end portion of the cylindrical body of the feed mixer includes an annular flange 25 suitably attached, as at 26, to a hollow inlet casing 27 leading to the cylindrical body of the feed mixer. The opposite end portion of the cylindrical body 23 of the feed mixer has an annular flange 28 attached, as at 29, to a hollow outlet casing 30 leading from said cylindrical body of the feed mixer. The hollow casings 27 and 30 rest upon a cross member of the frame 22 to dispose the unit consisting of the cylindrical body 23 and said hollow casings in horizontal position. Bearings 31 at the opposite ends of said unit, and in hubs upon the hollow inlet and outlet casings 27 and 30, respectively, suitably support a feed mixer shaft 32 which is disposed longitudinally of the unit and is arranged desirably centrally of the cylindrical body 23 thereof.

The feed mixer shaft 32 is flexibly connected, as at 33, with the shaft of a motor 34 supported upon the frame, for driving said feed mixer shaft.

A feed inlet 35 to the hollow casing 27 leads from the bin 15. A feeder, indicated generally at 36, is disposed beneath the bin 15 to receive granular feed therefrom, and includes means (not shown) for conveying the feed to the feed inlet 35. The feeder 36 may be actuated to convey a continuous stream of granular feed of predetermined quantity from the bin 15 to the hollow inlet casing 27. Means for driving the feeder may include a sprocket chain 37 upon a sprocket 38 carried by the feed mixer shaft 32, and ridable over a sprocket 39 upon a short shaft 40, suitably mounted upon the frame, which carries a small gear 41 meshing with a larger gear 42 upon a shaft 43, also suitably mounted upon the frame. The shaft 43 carries a gear 44 upon which rides a sprocket chain 45 carried by a gear 46 upon a shaft 47, suitably mounted upon the frame, connected to drive mechanism, designated generally at 48, set up to rotate a shaft 49 of the feeder 36. The driving arrangement within the feeder 36, actuated by the shaft 49, can be any ordinary or preferred driving arrangement for feeding granular material designed to convey a continuous stream of predetermined quantity of material to the feed inlet 35. See the arrows in Fig. 1. The feed inlet 35 can be associated with the feeder 36 in any convenient manner.

The purpose of the regulator 18 is to continuously feed a predetermined quantity of material, in the instance as shown molasses, through the pipe 21 to the interior of the feed mixer. Said regulator is adjustable to increase or decrease the feed of the molasses.

Referring more particularly to Figs. 5 to 11, the regulator consists of a casing 50, suitably supported upon the frame of the machine, providing a cylindrical chamber 51 enclosed by said casing and a cover 52 therefor attached to the casing as at 53. A bearing 54, integral with the wall of the casing 50 opposite the cover 52, rotatably supports a bushing 55 the outer end of which desirably terminates beyond the outer end of the bearing 54. Said outer end of the bushing 55 fixedly carries an eye 56 of a bracket 57 which supports a locking device 58 adapted to be slid in an arcuate slot 59 of a wall 60 upon the casing 50 and disposed circumferentially of the bearing 54. It will be evident that the bushing 55 is adapted to be rotated in the bearing 54 by movement of the bracket 57 along the arcuate slot 59, and that said bracket is adapted to be locked in said slot, as by the locking device 58, to secure the bushing in any adjusted position to which rotated in the bearing.

The bushing 55 rotatably supports a driving shaft 61 which carries a rotor 62 arranged within the chamber 51. An oil cup 63, within the bushing and leading to the shaft 61, passes through an elongated slot in the bearing 64 and thus offers no interference to rotation of the bushing 55 by manipulation of the bracket 57.

The shaft 61 is eccentrically mounted in the bushing 55, so that by rotation of said bushing in the bearing 54 the rotor 62 can be adjusted sidewise within the chamber 51, from the position as shown in Fig. 8 to any desired position at the left of said shown position.

The rotor 62 includes radial slots 65 adapted to receive the body 66 of wiper elements which include spaced arms 67 adapted to ride upon circular shoulders 68 carried by the casing 50 and its cover 52, respectively, and arranged at opposite faces of the rotor, in concentric relation to the periphery or shell of the casing. The wiper elements are adapted to divide the space between the rotor and its shell into the usual pump chambers, designated 69, and said pump chambers are adapted to transport the material, molasses as shown, from the inlet 20 of the regulator to the outlet 70 thereof opening to the pipe 21 leading to the feed mixer 17.

It will be evident that the amount of material carried by the pump chambers 69 from the inlet 20 of the regulator to the outlet 70 thereof can be easily varied by turning adjustment of the bushing 55 in the bearing 54 to move the rotor 62 sidewise in the chamber 51. While such adjustment does not alter the position of the wiper elements 66 with respct to the shell of the casing, said adjustment does alter the sizes of the pump chambers 69. Adjustment of the rotor towards the left in Fig. 8 decreases the size of said pump chambers 69. As shown, said pump chambers have maximum dimensions to pump a maximum quantity of material, such as molasses, through the regulator. Thus, the regulator can be set to continuously convey any predetermined and measured quantity of material from the feed tank 16 to the feed mixer 17 while the motor 34 is operating at constant speed. The wiper elements 66 fit snugly, but slidably, in the radial slots 65 of the rotor, and seal the pump chambers. The outer face of the wall 60 of the casing 50 may be provided with a scale located along the arcuate slot 59 for indicating the quantity of material discharged by the regulator for any set position of the bracket 57 when the motor 34 is operating at a designated rate of speed. It will be noted that if the motor is rotated at a constant rate of speed, the pressure of the material against the rotor and wiper elements will not vary the quantity of material being discharged.

Attention is called to the fact that while the above description has been made with particular reference to liquids, as for example, molasses, the present regulator, perhaps with minor changes such as the position of the intake and discharge orifices, may be employed for feeding any free-blowing solids such as sand, sugar, grain, screenings, or the like.

The rotor shaft 61 may be driven in any suitable manner. As disclosed, a sprocket 71 upon the shaft 43 carries a sprocket chain 72 which rides over a sprocket 73 upon said shaft 61. It is to be noted that adjustment of the bushing 55 in the bearing 54 does not materially alter the distance between the sprockets 71 and 73, the shaft 61 simply moving sidewise when adjusted, so that no means for adjustably tensioning the sprocket chain 72 is ordinarily necessary.

It will be seen that the regulator 18 can, in addition to being adjusted to continuously convey varied and predetermined amounts of feed, such as molasses, to feed mixer 17, be adjusted to regulate the amount of feed continuously conveyed by said regulator relatively to the amount conveyed by the feeder 36, so that the resultant feed mixture produced in the feed mixer 17 can contain any desired and predetermined proportions of the feeds conveyed by the regulator 18 and the feeder 36, respectively, especially since both said regulator and said feeder are driven by a single propelling means, the motor 34. The total amount of mixed feed produced in the feed mixer 17 from time to time will of course depend upon the speed of rotation of said motor 34.

As shown more clearly in Figs. 2 and 4, the pipe 21 leading from the regulator 18 to the feed mixer 17 opens to an elongated compartment 74 of a fitting 75 disposed above spaced apart, inwardly, desirably vertical, projecting spouts 76 integral with an upper portion of the wall of the cylindrical body 23 of the feed mixer and arranged more closely adjacent the inlet end of the feed mixer. Spaced apart passageways 77 leading from the elongated compartment 74 open to nozzles 78, including a nozzle for each spout 76, arranged directly above enlarged concavities 79 opening to radially disposed ports 80 through the spouts 76. The lower end of each spout 76 is desirably cut away, as indicated at 81 in Fig. 4, to be oblique to the corresponding port 80 through the spout.

The feed mixer shaft 32 supports a plurality of feeding and feeding and mixing blades for mixing the feeds conveyed to the feed mixer by the regulator 18 and the feeder 36, and for conveying the mixture along the feed mixer from the hollow inlet casing 27 to and out of the hollow outlet casing 30.

As disclosed, a series 82 of radial feeding blades carried by the feed mixer shaft 32 is disposed within the hollow inlet casing 27 to convey the material entering through the inlet 35 to the cylindrical body 23 of the feed mixer. The upper portion of the hollow inlet casing 27, at the location of the feed inlet 35, is, as shown, disposed slightly below the elevation of the upper portion of the cylindrical body 23 of the feed mixer, while the lower portion of said hollow inlet casing 27 is disposed somewhat above the elevation of the lower portion of said cylindrical body. The feeding blades of the series 82 can be relatively short, but of sufficient length, about as illustrated in Fig. 2, to positively convey the unmixed feed from the hollow inlet casing 27 to the cylindrical body 23 of the feed mixer.

Another series 83 of radial feeding blades carried by the feed mixer shaft 32 is disposed within the end portion of the cylindrical body 23 adjacent the hollow inlet casing 27, between said inlet casing and the spout 76 which is closest to said hollow inlet casing, the left hand spout in Fig. 2. Each blade of the series 83 is relatively long, preferably having sufficient length to terminate closely adjacent to the inner surface of the cylindrical body 23 about as illustrated in Fig. 2.

A series 84 of radial feeding and mixing blades carried by the feed mixer shaft 32 is disposed within the cylindrical body 23 adjacent the series 83 of feeding blades, and is arranged along the shaft 32 from position slightly in advance of the first spout 76, the one at the left in Fig. 2, to position slightly beyond the last spout 76, the one at the right in said Fig. 2. The blades of the series 84 are of length to travel in proximity to the oblique lower ends 81 of the spouts 76 when the shaft 32 is rotated. Said shaft 32 is desirably rotated in the direction of the arrow in Fig. 4.

In the disclosure as made, granular material enters the hollow inlet casing 27 through the inlet 35. The blades 82 feed the granular material into the cylindrical body 23, and here the blades 83 pick up said granular material and feed it to the blades 84. The molasses enters through the ports 80 of the spouts 76, at the top of the feed mixer 17, and the blades 84 pick up the granular material, as the shaft 32 rotates, and cause a considerable portion of the mixing of the granular material and the molasses to occur at the location of entry of the molasses to the feed mixer, to thus obviate the passage of any appreciable quantity of free molasses to the lower portion of the inner face of the feed mixer, where said molasses ordinarily becomes caked in constructions heretofore known, as, for example, in those constructions in which the molasses enters the feed mixer at the bottom thereof. The oblique lower ends 81 of the spouts 76 make provision for a better union between the molasses and the granular material. Blades 84 continuously carry the granular material into the path of travel of the molasses as it flows from the ports 80, and the bulk of the molasses is here mixed with the granular material. Any molasses not mixed with the granular material at location adjacent the spouts 76 will almost of necessity become mixed with said granular material before the molasses can move past all of the blades 84 to a lower surface of the feed mixer, as will be evident.

Another series 85 of blades carried by the shaft 32, and similar to the blades 83, is arranged between the blades 84 and the hollow outlet casing 30. The blades 85 are for the purpose of transporting the mixture produced at the location of the blades 84 to the hollow outlet casing. In practice, the blades 85 further agitate the produced mixture while conveying it to said hollow outlet casing.

A set of expelling blades 86 upon the feed mixer shaft 32 is arranged in the hollow outlet casing 30 to convey the mixture through an outlet passage 87 of said casing 30 which may lead to bagging conveyors, or other suitable location. The outlet passage 87 may desirably be positioned above the axis of the shaft 32, at one side of the hollow outlet casing 30, about as shown in Fig. 3. The expelling blades 86 impart to the feed what may be described as a rubbing action simultaneously with the function of expelling the feed through the discharge opening 87.

It will be apparent that by causing the ingredients of a feed mixture to be produced to commingle or mix together at location spaced from the wall of the feed mixer, preferably at an upper portion of the feed mixer, before any more or less viscous ingredient, such as molasses, will have opportunity to become settled or caked upon the wall of said feed mixer, the feed mixer can be kept clean to offer no interference to the advance or rotative movements of the feeding and mixing blades, and to present no obstacle to efficient, continuous operation of the feed mixer.

I claim as my invention:

1. In a feed mixing machine, a mixing chamber, means for conveying a mass of dry ingredient through said chamber, and means extending into said chamber and in the path of movement of said mass of dry ingredient for introducing a liquid ingredient into the interior of said mass of dry ingredient.

2. In a feed mixing machine, a mixing chamber, a liquid ingredient nozzle extending into said chamber, means for feeding a mass of dry ingredient through said chamber and around said nozzle whereby said liquid ingredient is introduced into the interior of said mass of dry ingredient, and means for mixing and conveying said ingredients in said chamber.

3. In a feed mixing machine, a mixing chamber having a discharge opening, means for delivering a mass of dry ingredient into said chamber, means for delivering a liquid ingredient into the interior of said mass of dry ingredient, a plurality of combined feeding and mixing blades in said chamber, means for operating said blades for conveying said mass of dry ingredient to the point of entry of said liquid ingredient for mixing said ingredients and for feeding the resultant mixture through said chamber toward said discharge opening, and means adjacent said discharge opening for imparting a rubbing action to said mixture as it is discharged through said opening.

4. In a feed mixing machine, a mixing chamber, a rotatable shaft provided with impelling and mixing blades in said chamber, means for introducing a dry ingredient into said chamber, means for rotating said shaft at high speed to produce a thick liner ring of dry ingredient and for conveying said dry ingredient through said chamber, a plurality of nozzles extending into said chamber in position to penetrate into said liner ring of dry ingredient, means for supplying a liquid ingredient to said nozzles to be introduced into the interior of said ring of said dry ingredient, whereby upon continued rotation of said shaft said liquid ingredient will penetrate said dry ingredient from the inside of said ring outwardly.

RICHARD G. QUEHL.